(12) United States Patent
Huang

(10) Patent No.: US 6,195,312 B1
(45) Date of Patent: Feb. 27, 2001

(54) CD CHANGING DEVICE

(75) Inventor: J. Y. Huang, Tainan Hsien (TW)

(73) Assignee: Ya Horing Electronic Co., Ltd., Tainan (TW)

( * ) Notice: Subject to any disclaimer, the term of this patent is extended or adjusted under 35 U.S.C. 154(b) by 0 days.

(21) Appl. No.: 09/292,910

(22) Filed: Apr. 16, 1999

(51) Int. Cl.[7] ................................................. G11B 17/26
(52) U.S. Cl. ............................................ 369/37; 369/75.1
(58) Field of Search ..................................... 369/75.1, 37

(56) References Cited

U.S. PATENT DOCUMENTS

| | | | |
|---|---|---|---|
| 4,755,978 | * | 7/1988 | Takizawa et al. ...................... 369/37 |
| 5,123,005 | * | 6/1992 | Kurosu ................................ 369/77.1 |
| 5,146,451 | * | 9/1992 | Kang ................................... 369/270 |
| 5,193,079 | * | 3/1993 | Ko et al. ............................... 369/37 |
| 5,386,403 | * | 1/1995 | Morioka et al. ....................... 369/37 |

* cited by examiner

*Primary Examiner*—William Klimowicz
(74) *Attorney, Agent, or Firm*—Pro-Techtor International Services

(57) ABSTRACT

A CD changing device including a bottom disc that is moved back and forth in a slide groove by a projecting gear, a turntable disposed on the bottom disc to receive a CD, a limit rod provided on the bottom of the projecting gear carrying a spring, and a slide block on the limit rod. The slide groove has a left-biasing mouth and a right-biasing mouth. The case has a rack engaging a bottom gear, and the bottom disc has a teeth base facing the rack. The slide block prohibits the linear motion of the bottom disc from interfering with rotation of the turntable.

3 Claims, 10 Drawing Sheets

CD CHANGING DEVICE

BACKGROUND OF THE INVENTION

This invention relates to a CD changing device for a compact disc player, particularly to one having a turntable on a bottom disc that moves back and forth without swaying and prevents the bottom disc from being pulled out by an exterior force. This increases stability when changing CD's and increases its service life.

There is a known CD changing device disclosed in a Japanese patent by Toku-Kai-Hei, number 49959, issued Feb. 20, 1998.

SUMMARY OF THE INVENTION

The present invention has been devised to offer a new simple CD changing device that moves back and forth without swaying, and prevents a bottom disc being from pulled out by an exterior force.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
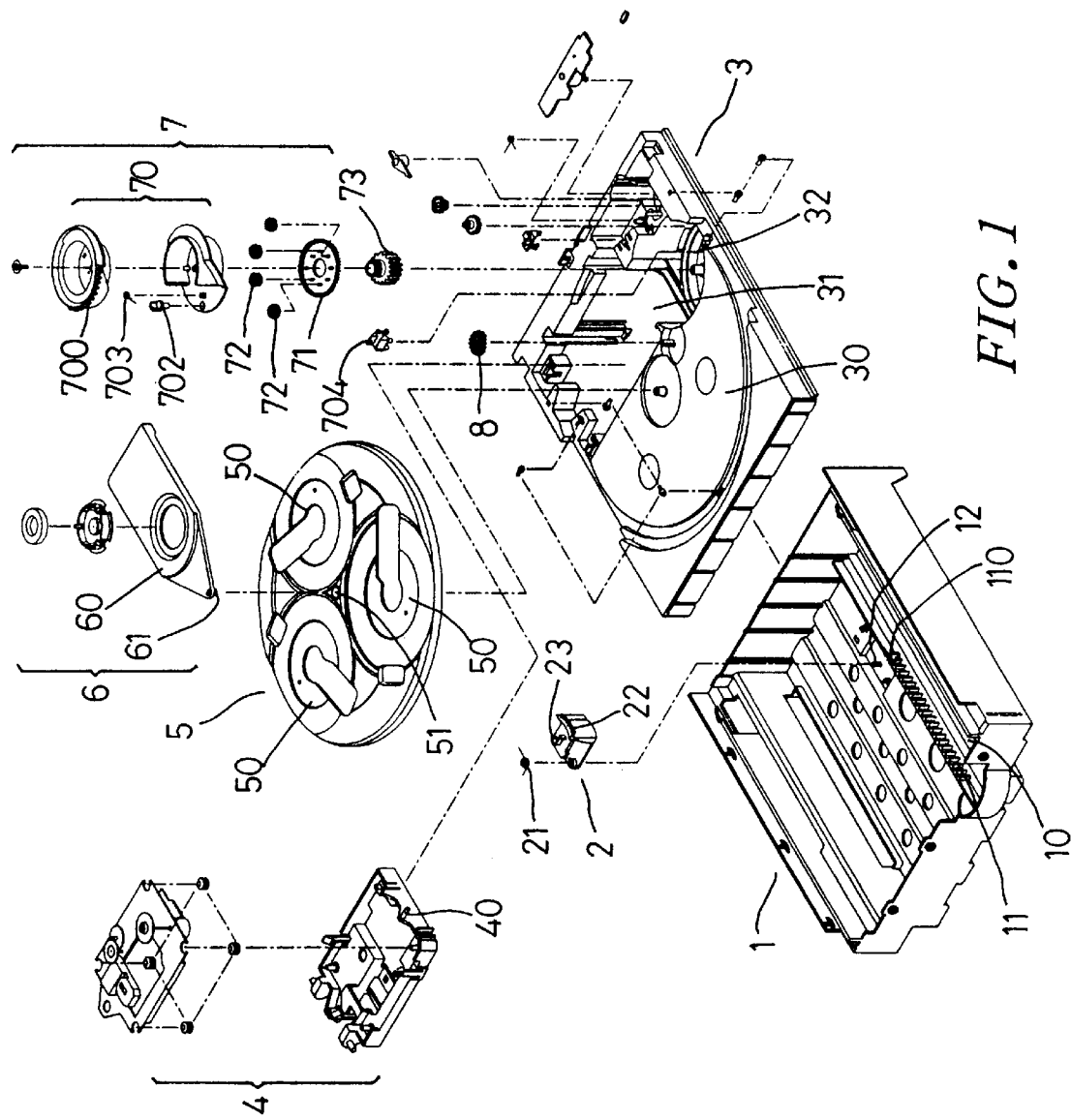
FIG. 1 is an exploded perspective view of a CD changing device of the present invention.

A preferred embodiment of a CD changing device of the present invention, as shown in FIG. 1, includes a case 1, a teeth base 2, a bottom disc 3, a CD reading mechanism 4, a turntable 5, a position unit 6, a gear group 7, and a middle gear 8 as main components.

Figure 7:
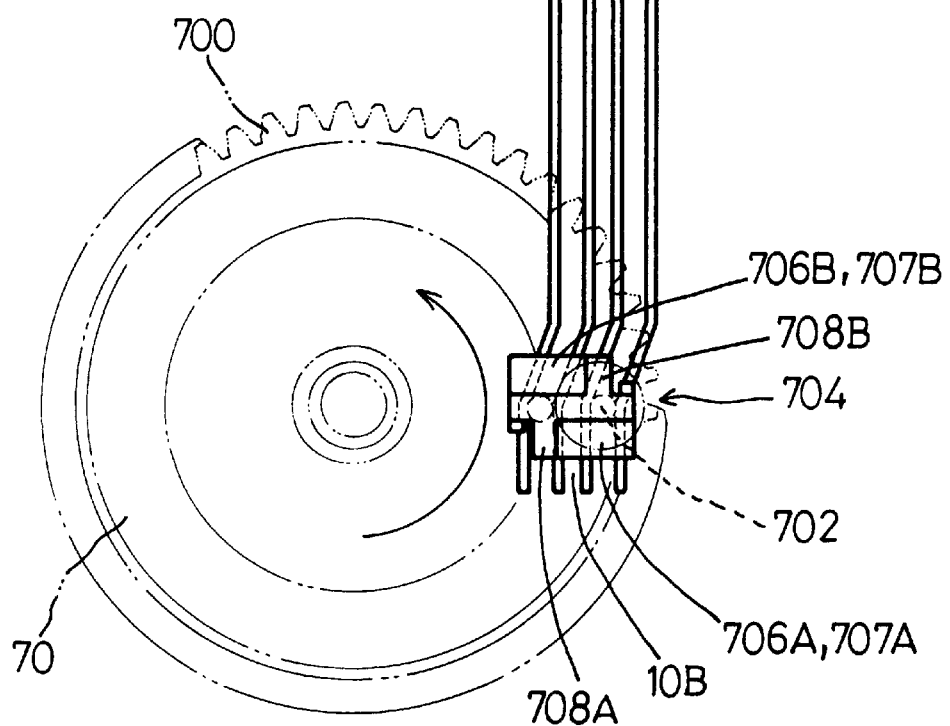
FIG. 7 is a view of a first CD changing action of the present invention.
Figure 8:
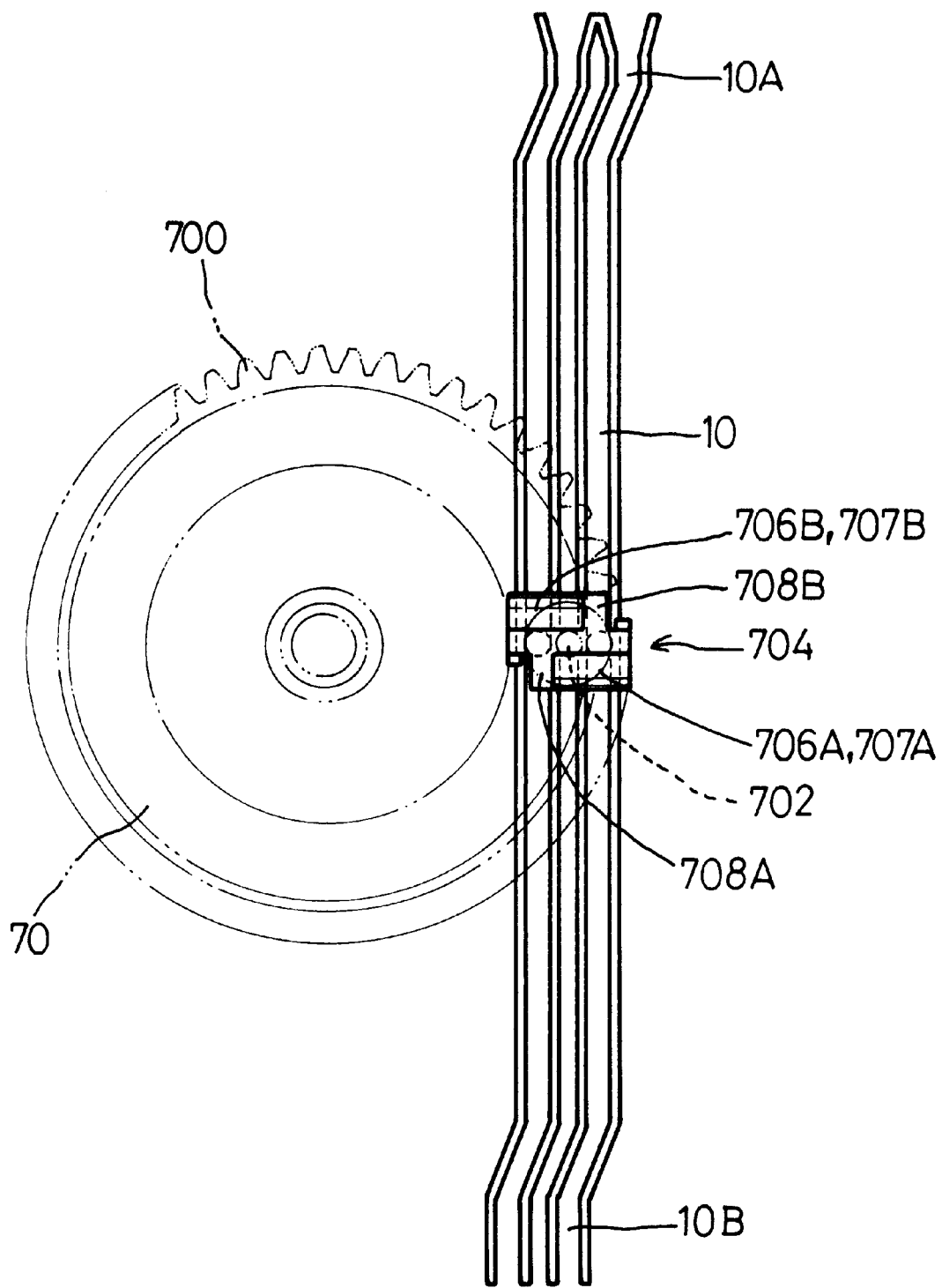
FIG. 8 is a view of a second CD changing action of the present invention.
Figure 10:
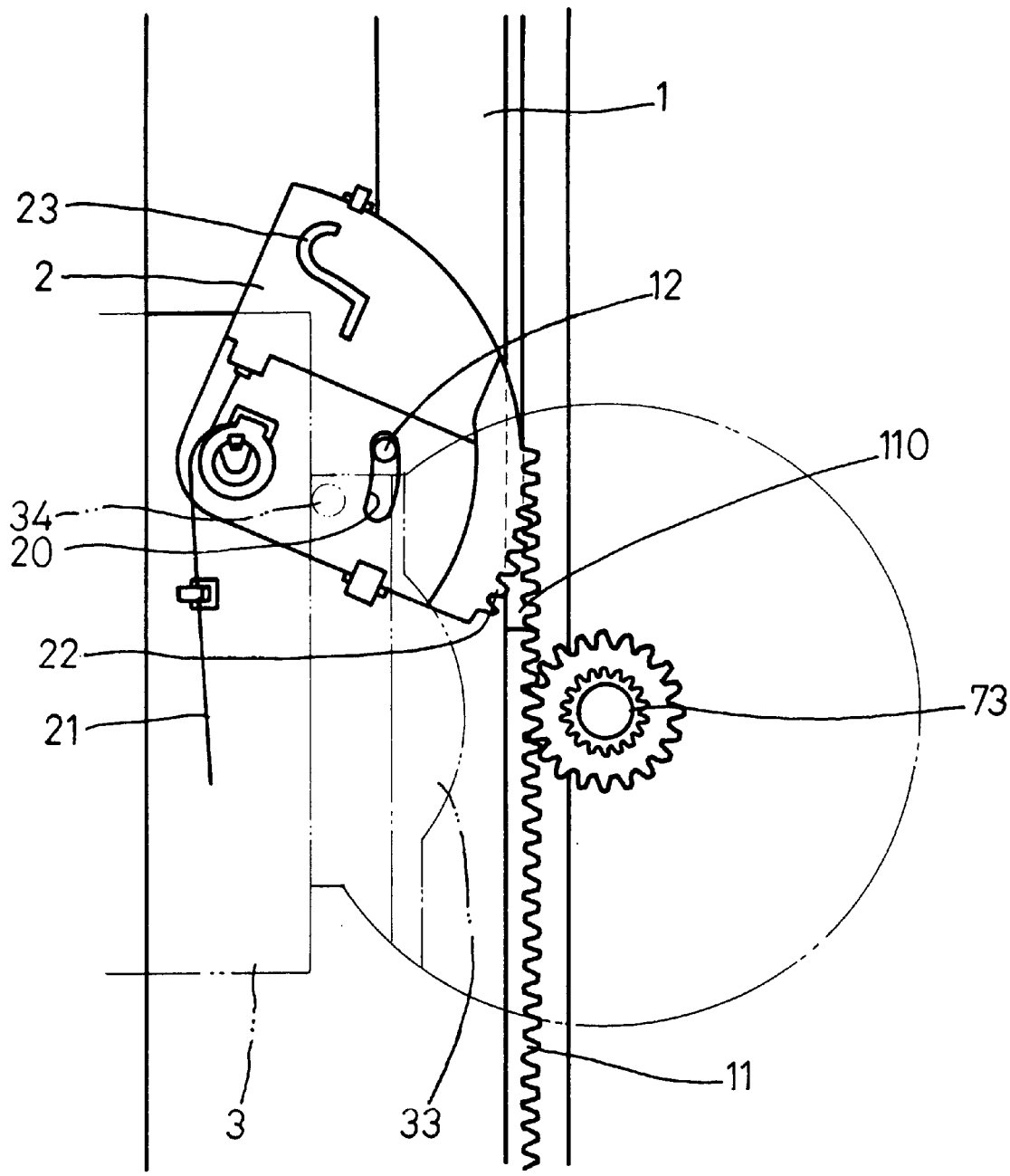
FIG. 10 is a view of a first anti-pulling safe action of the present invention.

The case 1 has an open upper side. The case 1 has a straight slide groove 10 and a rack 11 adjacent to the groove 10, as shown in FIGS. 7 and 8. The two ends of the straight slide groove 10 are formed respectively with a right-biasing mouth 10A, and a left-biasing mouth 10B, as shown in FIG. 7. The rack 11 is located inside and along the straight slide groove 10, with its teeth facing the groove 10. The rack 11 has a recessed surface 110 in a lower portion of the case 1, as shown in FIG. 10. A connect pin 12 is fixed on an upper surface of the bottom of the case 1 near the rack 11 for connecting with the teeth base 2.

The teeth base 2 as shown in FIGS. 1 and 10 has a curved surface facing the rack 11 and a curved slot 20 in an intermediate portion to receive the connect pin 12. The teeth base 2 is urged by a torque spring 21 so that the curved surface always fits in the recessed surface 110 of the rack 11. The curved surface has a plurality of teeth 22 to form a short rack aligned with the rack 11. The teeth base 2 further has a hook 23 formed on an upper side. The curved portion of the teeth base 2 faces the rack 11.

Figure 11:
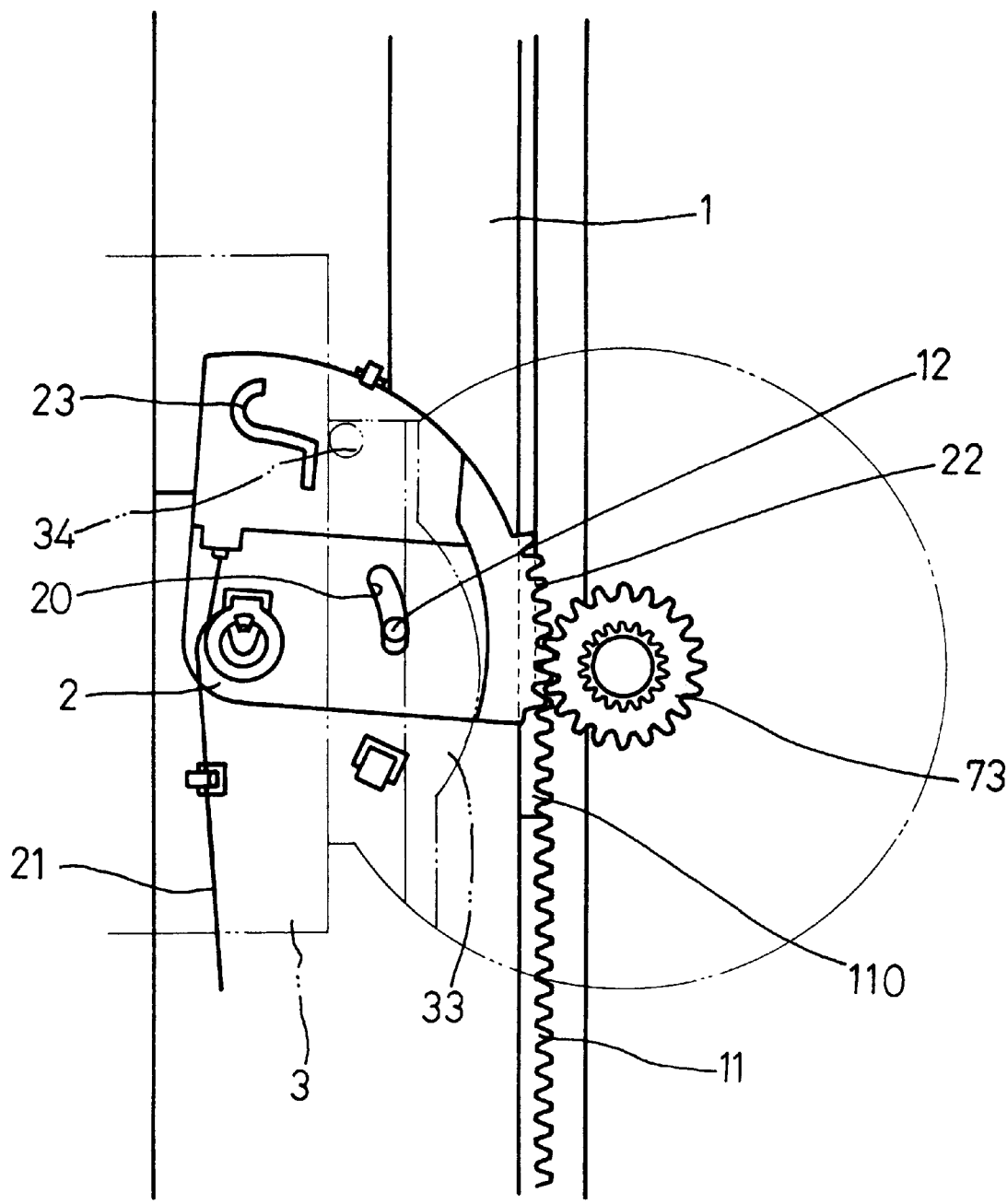
FIG. 11 is a view of a second anti-pulling safe action of the present invention.
Figure 12:
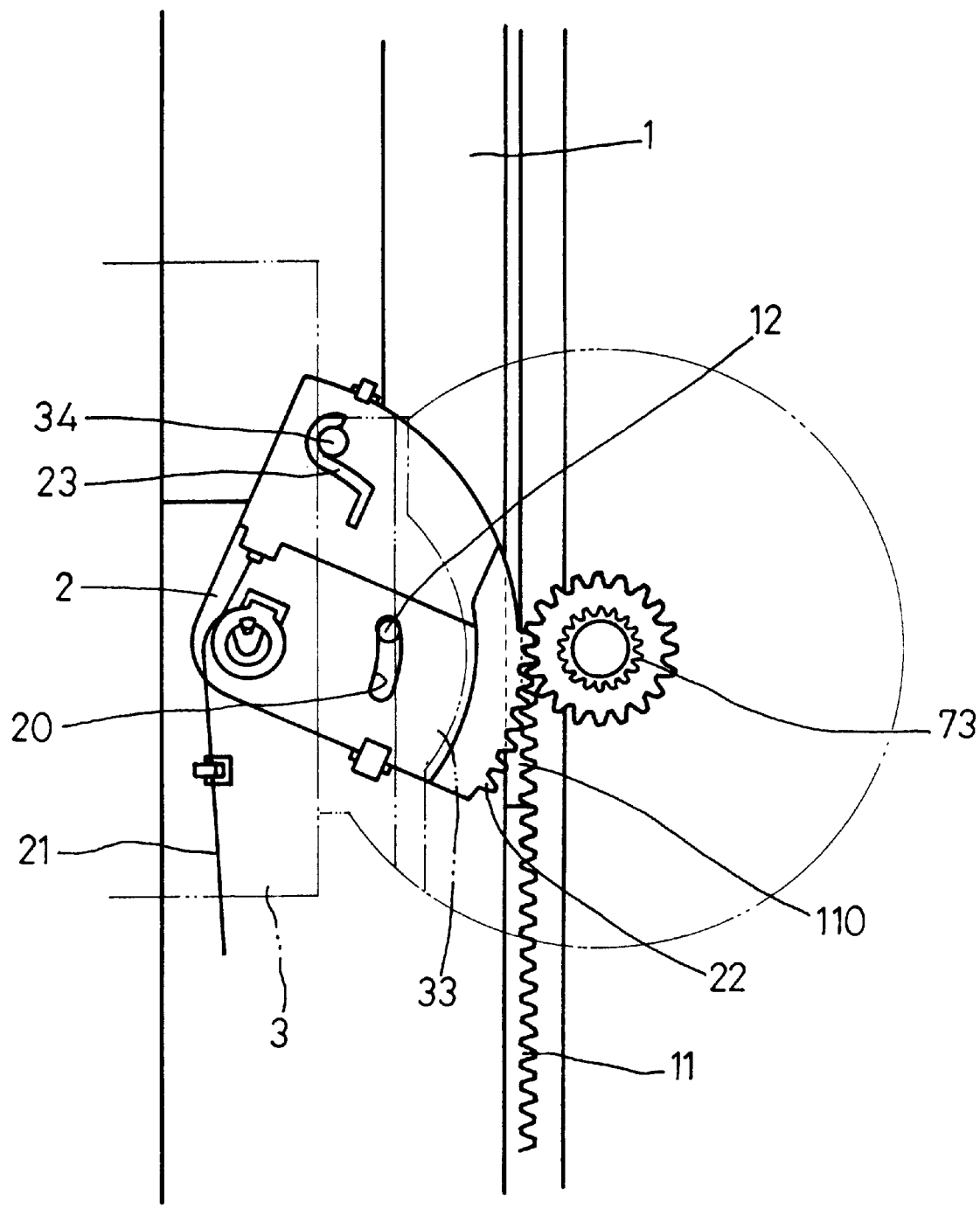
FIG. 12 is a view of a third anti-pulling safe action of the present invention.

The bottom disc 3 shown in FIG. 1 is slidable within the case 1. The bottom disc 3 has a turntable rotating section 30 recessed in an upper front surface, a support section 31 formed behind the turntable rotating section 30 for supporting the CD reading mechanism 4, and a gear group section 32 to receive the gear group 7 that drives the turntable 5 in the turntable rotating section 30. The bottom disc 3 is further provided with a slide member 33 formed on the bottom surface and situated to correspond to the location of the teeth 22 of the teeth base 2. The slide member 33 pushes the teeth base 2 through an angle when the slide member 33 is moved, as is shown in FIG. 11. The bottom disc 3 has a hook pin 34 provided on a bottom surface for the hook 23 to hook on when the bottom base 3 moves inward, as shown in FIG. 12.

The CD reading mechanism 4 is located in the support section 31 of the bottom disc 3, having a connect rod 40 provided on an outer surface and facing the gear group section 32 of the bottom disc 3.

Figure 2:
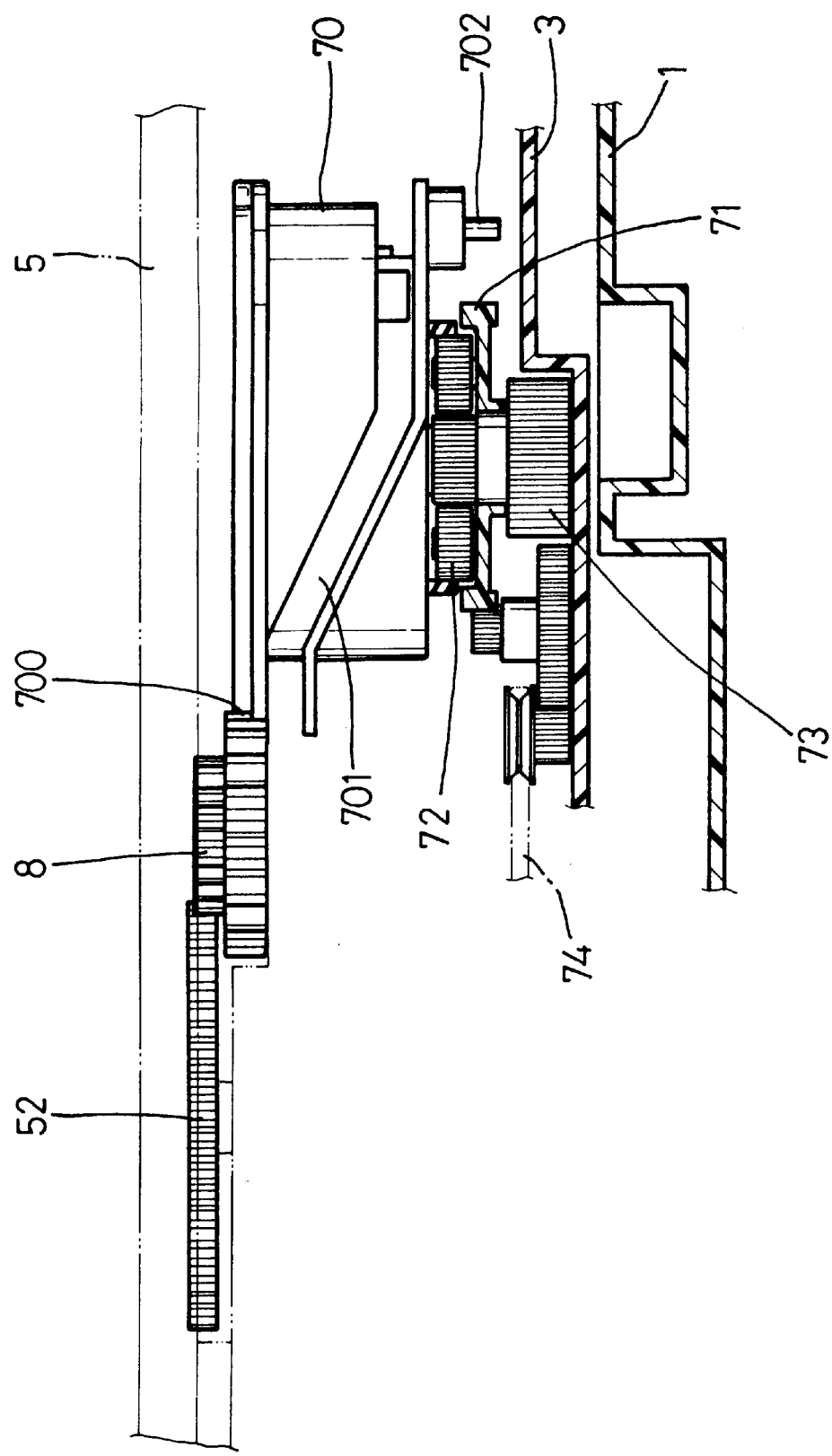
FIG. 2 is a cross-sectional view of a gear group of the present invention.

The turntable 5 is located in the turntable rotating section 30, and has a plurality of CD sections 50, a shaft hole 51 formed in the center, and a turntable gear 52 positioned in a center portion of a lower surface of the bottom, as shown in FIG. 2.

The position unit 6 is placed on the turntable 5 and has an engage plate 60 provided with a hook 61 at one end to extend into the shaft hole 51 of the turntable 5. The other end of the engage plate 60 engages tightly with a rear edge of the bottom disc 3 so that the turntable 5 is secured by the engage plate 60.

Figure 3:
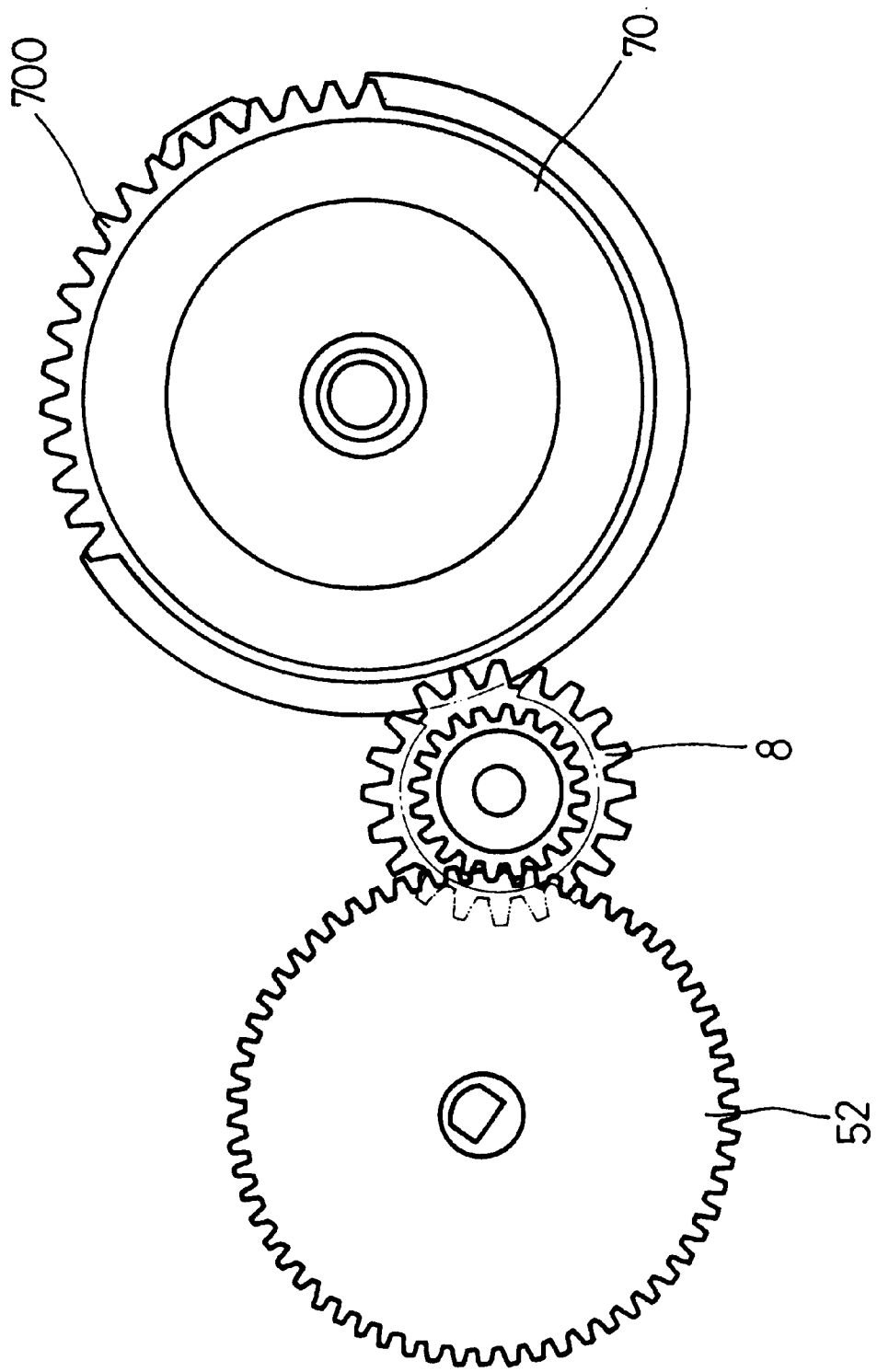
FIG. 3 is an upper view of the gear group of the present invention.
Figure 4:
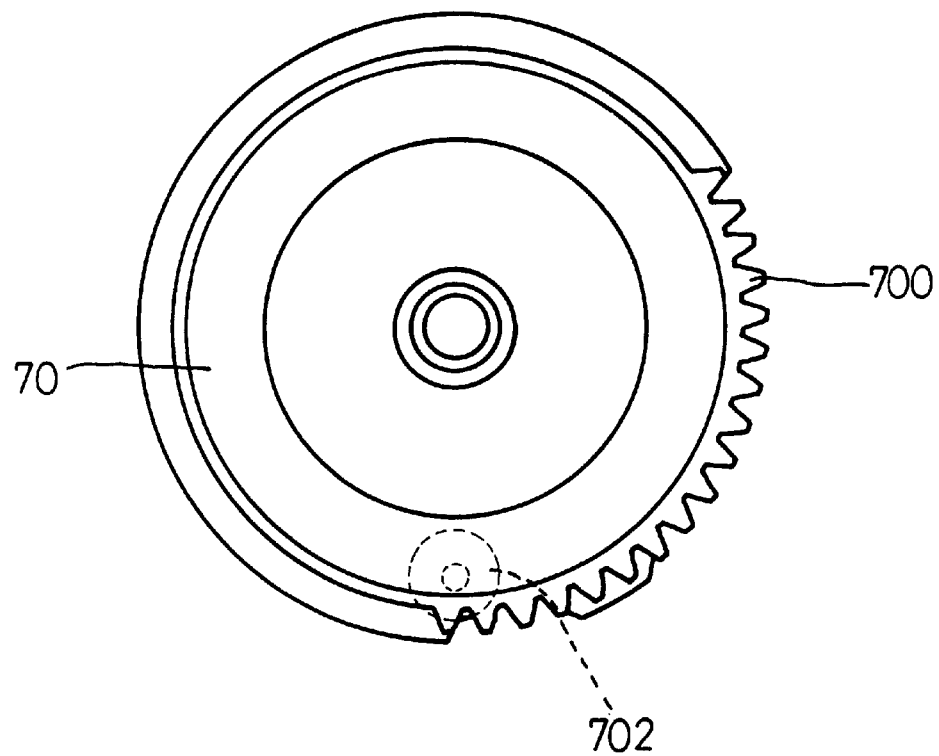
FIG. 4 is an upper view of a projecting gear of the present invention.
Figure 5:
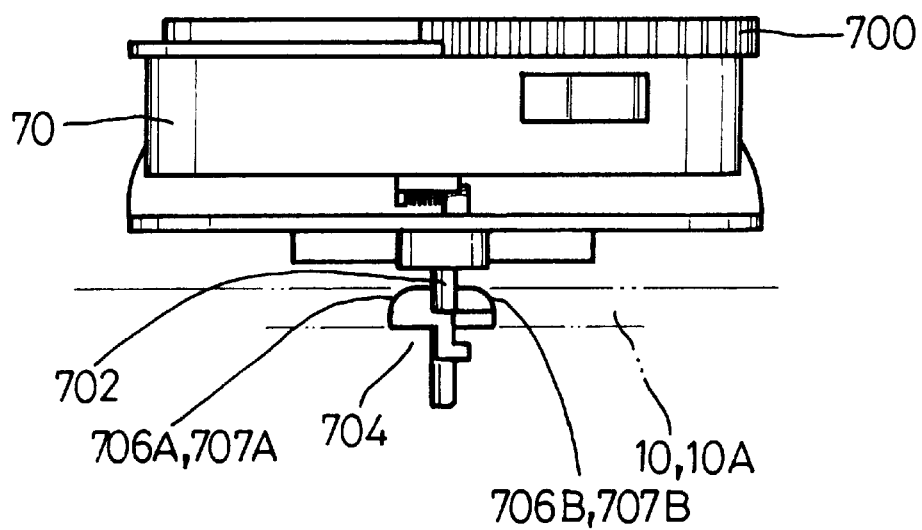
FIG. 5 is a side view of the projecting gear of the present invention.

The gear group 7, as shown in FIG. 1, is positioned in the gear group section 32 of the bottom disc 3. The gear group 7 has a projecting gear 70, a middle gear 71, four planetary gears 72, and a bottom gear 73. The projecting gear 70 has a section of teeth 700 on an outer circumferential edge, as shown in FIGS. 2 and 3, and an upward angled groove 701 that receives the connect rod 40 of the CD reading mechanism 4. When the projecting gear 70 rotates, it causes the CD reading mechanism 4 to rise or descend. A limit rod 702 is provided at the bottom of the upward angled groove 701 and extends downward. The limit rod 702 has a spring 703 fixed at its bottom end.

Figure 9:
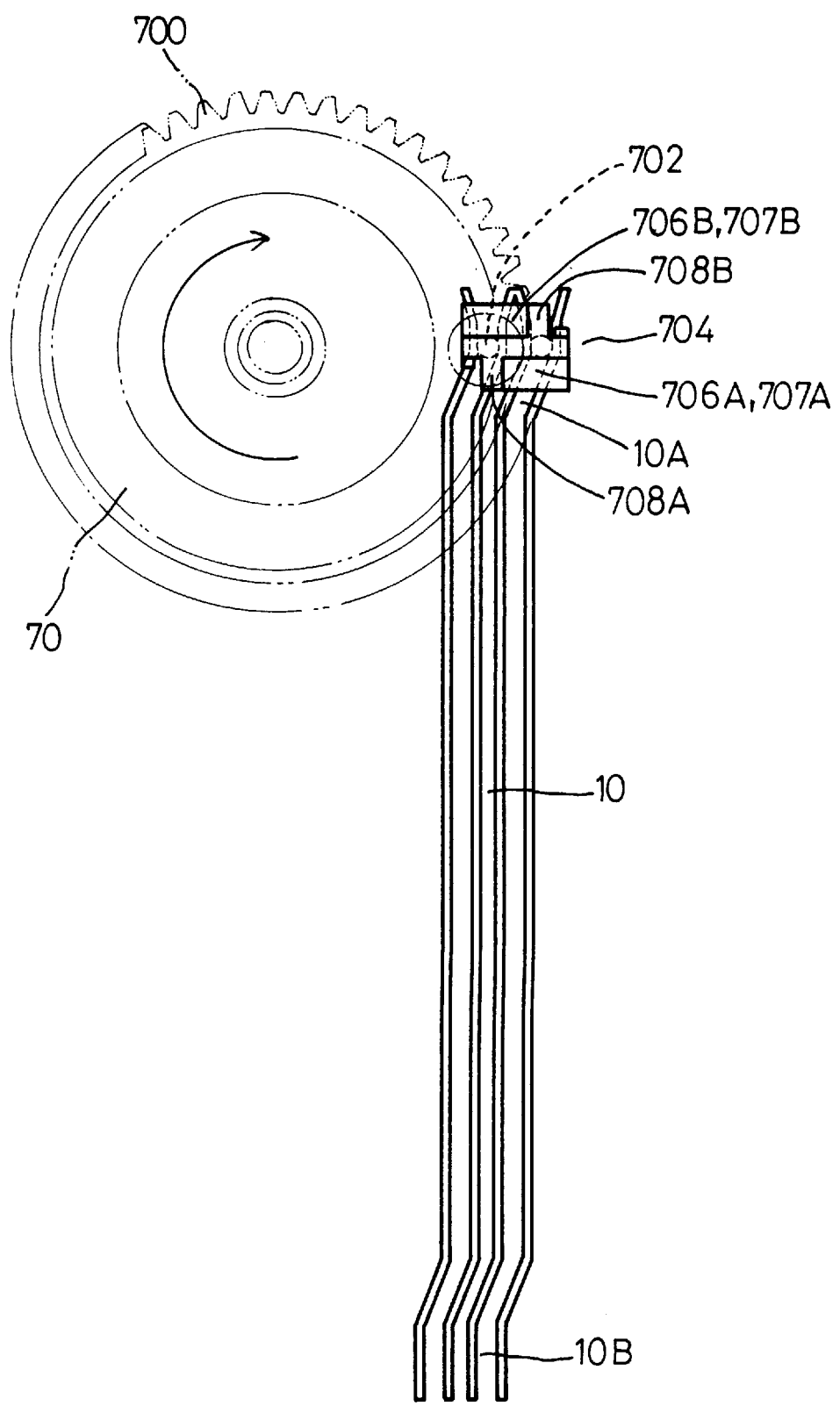
FIG. 9 is a view of a third CD changing action of the present invention.

A slide block 704 is provided under and moves with the limit rod 702. The slide block 704 has two feet 705 to fit and move in the slide groove 10 in the case 1, as shown in FIG. 7. The slide block 704 has two parallel projections 706A, 706B spaced apart, and the limit rod 702 is fitted between the two projections 706A, 706B. The two projections 706A, 706B each have a vertical face, a curved-down face 707A, 707B extending down from the vertical face, and a recess 708A, 708B formed at an opposite end, as shown in FIGS. 7, 8, and 9.

The middle gear 71, the four planetary gears 72, and the bottom gear 73 are rotated by the belt 74 driven by a motor. The bottom gear 73 engages the rack 11 of the case 1, as shown in FIG. 10, forcing the bottom disc 3 to move a long the rack 11 by rotation of the bottom gear 73 moved by the belt 74. Meanwhile the bottom gear 73 also rotates the four planetary gears 72, which then rotate the projecting gear 70. The teeth 700 of the projecting gear 70 engage the middle gear 8 so that the middle gear 8 rotates the turntable gear 52. Thus, the belt 74 driven by the motor rotates the bottom gear 73, which then moves along the rack 11, so that the bottom disc 3 carrying the turntable 5 can move back and forth. The belt 74 also rotates the bottom gear 73, the four planetary gears 72. the projecting gear 70, the middle gear 8 and the turntable gear 52 so that the turntable 5 is rotated at the same time. Therefore, the two kinds of movement, a linear one and a circular one, do not interfere with each other.

The middle gear 8 is rotated by the section of teeth 700 of the projecting gear 70, and the turntable gear 52 then receives rotating power from the middle gear 8.

As seen from the above description, rotation of the turntable 5 depends on the turntable gear 52 being rotated by the middle gear 8 driven by the teeth 700 of the projecting gear 70 as shown in FIGS. 2 and 3. But when the teeth 700 of the projecting gear 70 have not yet reached the middle gear 8, the turntable 5 carrying the CD does not rotate. Linear movement of the bottom disc 3 depends on the engagement of the bottom gear 73 with the rack 11. When the bottom gear 73 is rotated, the bottom gear 73 (the bottom disc 3) can move straight along the rack 11. So in changing CD's, the gear group 7 must be moved by the motor, and then, utilizing engagement of the bottom gear 73 with the rack 11, the device can move the bottom disc 3 out of the case 1. Then the CD placed on the turntable 5 may be replaced with a new one.

During movement of the bottom disc 3, the limit rod 702 at the bottom of the projecting gear 70 of the gear group 7 is stopped by the two limit projections 706A, 706B of the slide block 704 (as shown in FIG. 8). The recesses 708A, 708B of the slide block 704 do not align to the limit rod 702 to permit the rod 702 to move together with the projecting gear 70. Consequently the projecting gear 70 does not produce error during movement of the bottom disc 3. Further, the CD reading mechanism 4 driven by the projecting gear 70 does not sway to cause noise, and neither does the turntable 5 rotate at random.

When the slide block 704 slides to the outermost point of the slide groove 10 (as shown in FIG. 7), the slide block 704 moves to the left side because of the right-biasing mouth 10B at the outermost point of the slide groove 10, permitting the recess 708B to align with the limit rod 702. At this point the bottom disc 3 moves no further, and the projecting gear 70 is driven towards the recess 708B. The limit rod 702 is then no longer limited by the slide block 704, permitting the projecting gear 70 to rotate freely. When the limit rod 702 rotates to contact the projection 706A, the curved projection 707A facing the limit rod 702 presses upward the spring 703 and slides over the projection 706A, letting the projecting gear 70 rotate freely the turntable 5 smoothly.

On the other hand, when the bottom disc 3 is retracted to a position above the case 1, with the slide block 704 also retreating to the innermost point of the slide groove 10 (as shown in FIG. 9), the slide groove 10, due to the right-biasing stop mouth 10A, forces the limit rod 702 to the right side aligned with the recess 708A, where it is no longer stopped by the projection 706A. So when the projecting gear 70 rotates clockwise, the limit rod 702 is not stopped so that the projecting gear 70 rotates smoothly to let CD's be read one by one.

Figure 6:
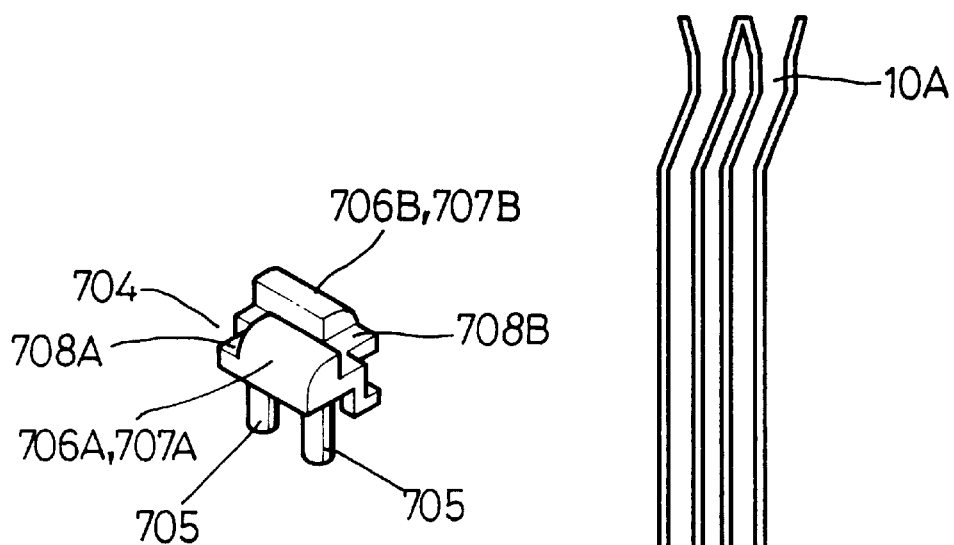
FIG. 6 is a perspective view of a slide block of the present invention.

Whether the bottom disc 3 retracts into the case 1 or extends out of the case 1, with the projecting gear 70 rotating clockwise or counterclockwise, rotating rounds of the projecting gear 70 provide linear movement of the limit rod 702. When the limit rod 702 is rotated together with the projecting gear 70 in either of the two positions, the limit rod 702 may contact the projections 706A in its path after nearly one round of rotation, but the limit rod 702 always slides over them. More particularly, as shown in FIG. 7, when the projecting gear 70 is rotated counterclockwise, the limit rod 702 necessarily rotates together for one revolution and comes into contact with the projection 706A. Then the limit rod 702 slides over the inclining-down face 707A (shown in FIG. 6) to the recess 708B and over the slide block 704.

In addition, the bottom disc 3 depends on the bottom gear 73 of the gear group 7 engaging the rack 11 when retracted back into the case 1, as shown in FIG. 10. The bottom disc 3 has a slide base 33 facing the teeth base 2 provided with the case 1, as shown with a dotted line in FIG. 10. So during retraction of the bottom disc 3, the slide base 33 not only contacts the teeth base 33, but the bottom gear 73 engages and moves along the rack 11 to subsequently engage the teeth 22 of the teeth base 2 (as shown in FIG. 11). Then the teeth base 2 is rotated through an angle by the bottom gear 73 (as shown in FIG. 12), permitting the hook pin 34 fixed under the lower surface of the bottom disc 3 to be secured by the hook 23 of the teeth base 2. This secures the bottom disc 3 in a stable retracted position, with no possibility of sliding out at random or being pulled out by an exterior force.

While the preferred embodiment of the invention has been described above, it will be recognized and understood that various modifications may be made therein and the appended claims are intended to cover all such modifications which may fall within the spirit and scope of the invention.

I claim:

1. A CD changing device comprising:
    a case having a hollow cavity and an open upper side,
    a bottom disc positioned above said case,
    a turntable positioned on said bottom disc, said turntable receives a CD,
    a CD reading mechanism,
    a gear group, and
    a motor to drive said gear group and said turntable; wherein
        said case comprises a straight slide groove and a rack on an upper surface of a bottom of said case, said slide groove has two ends respectively provided with a right-biasing mouth and a left-biasing mouth, said gear group having a projecting gear rotating said turntable, said projecting gear having a limit rod extending down from a lower surface, said limit rod having a spring to force said limit rod move straightly, said limit rod carrying a slide block under its bottom to move together, said slide block having two feet extending in said slide groove of said case and two parallel projections facing each other and forming an opening therebetween, said two projections each have a recess at one end, a vertical face, and a curved face extending downward from said vertical face, said limit rod is positioned at connect ends of said two projections and is prevented from moving by said two projections, said projecting gear and said turntable are also prohibited from rotation when said slide block is moving in said slide groove;
        said projecting gear rotates the turntable when said slide block is moved to the innermost or the outermost point of said slide groove, forcing said limit rod to separate from one of said projections of said slide block and move towards said recess and rotate along said curved face clockwise or counterclockwise;

said bottom disc having a bottom gear engaging said rack of said case to permit said bottom disc to move in a straight line when said bottom gear is rotated, a teeth base is provided on said rack, and said teeth base includes a hook with a curved portion facing said rack, said bottom disc having a hook pin to secure said hook of said teeth base so as to let said bottom disc move back into said case and to be secured therein.

2. The CD changing device as claimed in claim 4, wherein:

said gear group is driven by a single motor, including four flat planetary gears located between said projecting gear and said bottom gear for rotating said projecting gear, said projecting gear having a section of teeth on an outer circumferential edge, said teeth of said projecting gear engaging a middle gear, said middle gear engaging a turntable gear rotating said turntable, said single motor rotating said bottom gear for moving said bottom disc back and forth in a straight line, said single motor also rotates said bottom gear, which rotate said projecting gear, said projecting gear also being rotated by said planetary gears to force said section of teeth to rotate said middle gear, thereby rotating said turntable gear; such that linear movement of said bottom disc does not interfere with rotation of said turntable.

3. The CD changing device as claimed in claim 1, wherein:

said bottom disc has a slide base in a location corresponding to that of said teeth base, permitting said slide base to cause said teeth base to rotate through an angle so that said bottom gear engages a section of teeth of said teeth base so that said hook of said teeth base hooks said hook pin of said bottom disc so as to prevent said bottom disc from being pulled out by an exterior force, with said teeth base being rotated through said angle by said bottom gear.

* * * * *